United States Patent
Sechrist

(10) Patent No.: US 8,469,613 B2
(45) Date of Patent: Jun. 25, 2013

(54) ANTI-GLARE CAMERA HOOD WITH INTEGRATED MOVABLE LENS

(75) Inventor: Andrew Blough Sechrist, San Francisco, CA (US)

(73) Assignee: Koozoo Inc., San Francisco, CA (US)

( * ) Notice: Subject to any disclaimer, the term of this patent is extended or adjusted under 35 U.S.C. 154(b) by 0 days.

(21) Appl. No.: 13/449,152

(22) Filed: Apr. 17, 2012

(65) Prior Publication Data

US 2012/0263451 A1 Oct. 18, 2012

Related U.S. Application Data

(60) Provisional application No. 61/517,294, filed on Apr. 18, 2011.

(51) Int. Cl.
*G03B 17/00* (2006.01)
(52) U.S. Cl.
USPC ........................................................ 396/428
(58) Field of Classification Search
USPC ................ 396/419, 424, 428; 348/373–376
See application file for complete search history.

(56) References Cited

U.S. PATENT DOCUMENTS

| | | | | |
|---|---|---|---|---|
| 7,389,964 B2 * | 6/2008 | Ye | ............................. | 248/231.61 |
| 7,719,610 B2 * | 5/2010 | Kung et al. | .................... | 348/373 |
| 7,929,049 B2 * | 4/2011 | Yamane et al. | ................ | 348/373 |
| 2001/0007474 A1 * | 7/2001 | Gertz | ............................. | 348/373 |
| 2007/0285562 A1 * | 12/2007 | Raynor | ......................... | 348/373 |
| 2008/0079847 A1 * | 4/2008 | Kung et al. | .................... | 348/373 |
| 2008/0079848 A1 * | 4/2008 | Kung et al. | .................... | 348/373 |

* cited by examiner

*Primary Examiner* — Clayton E LaBalle
*Assistant Examiner* — Warren K Fenwick
(74) *Attorney, Agent, or Firm* — Edward C. Kwok; Hogan Lovells US LLP

(57) ABSTRACT

A support assembly for a camera having lens protruding from the camera includes (a) a hood having an opening to accommodate the protruding lens and a front end having a rim that lies on a single plane configured to rest snugly against a flat surface, the hood further includes a gimbaling collar around the opening to allow rotation of protruding lens around a symmetrical axis of the hood, so as to enable the camera to be positioned in any one of a number of positions that result in the protruding lens being pointed in one of a plurality of corresponding directions; (b) a base structure having a suction cup for attachment by suction on the flat surface; and (c) a connecting arm connecting the base structure to the hood.

6 Claims, 2 Drawing Sheets

ANTI-GLARE CAMERA HOOD WITH INTEGRATED MOVABLE LENS

CROSS REFERENCE TO RELATED APPLICATIONS

The present application is related to and claims priority of U.S. Provisional Patent Application ("Provisional Application"), Ser. No. 61/517,294, entitled "Anti-glare Camera Hood with Integrated Movable Lens," filed on Apr. 18, 2011. The disclosure of the Provisional Application is hereby incorporated by reference in its entirety.

BACKGROUND OF THE INVENTION

1. Field of the Invention

The present invention is related to video recording or broadcasting devices; in particular, the present invention is related to structures to avoid glare in video images captured from behind a glass window pane by a video camera.

2. Discussion of the Related Art

To record video of an outdoor scene over an extended time period (e.g., a month) typically requires a weatherproof camera (i.e., a camera ruggedized to withstand weathering). In one application, the captured video is broadcast to viewers over a wide area network (e.g., the internet). However, if the outdoor scene can be captured from behind a glass pane from the interior of a building, a low cost non-weatherproof cameras may be used. Indoor placement offers many advantages, such as protection from weather, theft, and easy access to power and other connectivity advantages. However, capturing an image from behind a glass window poses a significant technical challenge because of glare. Glare may result in the day time from, for example, the light from the other side of the window pane illuminating the camera body itself. The result is that the camera "sees" itself in the reflection. The glare may also come from light from the inside, when the reflections of the indoor illuminated space are brighter than the outside scenery the camera attempts to capture (e.g., at night). It is difficult, if not impossible, to eliminate these kinds of glare. The most frequently used solution to avoid glare in the image is to provide a custom hood to shield the reflected light from the camera lens. Even then, additional adjustments of the hood may be required when a moving camera's lens is pointed in certain directions. Besides being cumbersome to operate, some hoods are not even adjustable.

SUMMARY

According to one embodiment of the present invention, a support assembly for a camera having lens protruding from the camera includes (a) a hood having an opening to accommodate the protruding lens and a front end having a rim that lies on a single plane configured to rest snugly against a flat surface, the hood further includes a gimbaling collar around the opening to allow rotation of protruding lens around a symmetrical axis of the hood, so as to enable the camera to be positioned in any one of a number of positions that result in the protruding lens being pointed in one of a plurality of corresponding directions; (b) a base structure having a suction cup for attachment by suction on the flat surface; and (c) a connecting arm connecting the base structure to the hood.

The present invention is better understood upon consideration of the detailed description below, in conjunction with the accompanying drawings.

BRIEF DESCRIPTION OF THE DRAWINGS

To facilitate cross-referencing among elements in the various figures, like elements are assigned like reference numerals.

DETAILED DESCRIPTION OF THE PREFERRED EMBODIMENTS

Figure 1:
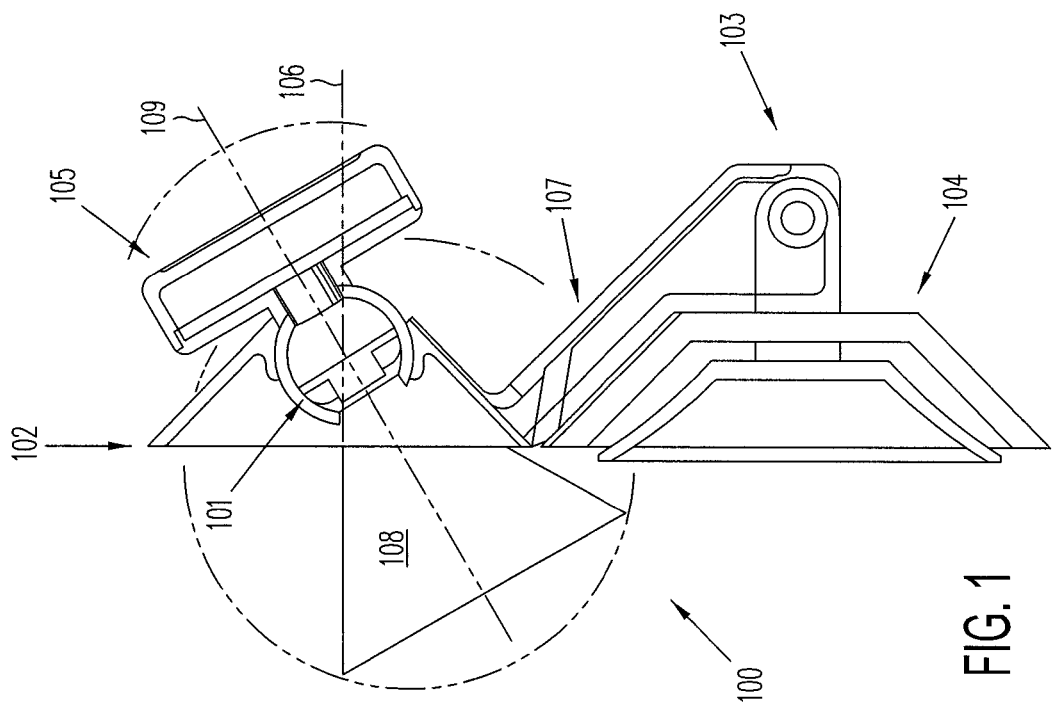
FIG. 1 shows a side schematic view of small camera system 100 which is configured to have protruding lens 101, hood 102 and suction cup support assembly 103, in accordance with one embodiment of the present invention.

The present invention provides a hood for a camera that solves the glare problem. FIG. 1 shows a side schematic view of small camera system 100 which is configured to have protruding lens 101, hood 102 and suction cup support assembly 103, in accordance with one embodiment of the present invention. As shown in FIG. 1, small camera system 100 includes camera body 105, which is attached to movable protruding lens 101 and conical hood 102. During use, hood 102 is immobilized to a window glass pane by suction cup assembly 104, to allow protruding lens 102 to capture the scenery on the other side of the window pane that is within its view. As shown in FIG. 1, hood 102 has an outer rim that lies in a single plane, such that the rim rests snugly and flush against the window plane. The angular view of the camera presented to protruding lens 101 is indicated by solid-angle view cone 108. Protruding lens 101 has a gimbaling collar (or a bowl-shape housing) that is attached to hood 102, such that a rotational motion of protruding lens 101 about axis 106 of hood 102 results in the rotation of solid-angle view cone 108 and in protruding lens 101 freely pointing at any of a large number of different directions defined by the circular locus of axis 109 in the rotation around axis 106. The rotational motion that points protruded lens 101 at a desired direction can be provided manually or under computer control. For manual positioning, the gimbaling collar may be implemented using a friction lock which maintains the position it is set in. In one embodiment, camera system 100 includes a motor inside the camera body that drives the rotational motion under computer control. In one embodiment, control signals may be generated as a result of commands provided to camera system 100 remotely over a wireless connection. Hood 102 restricts the amount of light entering the view of the camera, thereby minimizing the resulting glare. Suction cup assembly 103 includes suction cup 104 that secures camera system 100 to the window pane and connecting arm or connector 107 that holds hood 102 firmly against the window pane. Connecting arm 107 may include a hinge or pivoting mechanism that allows connector 107 to move hood 102 in one or more dimensions.

Figure 2:
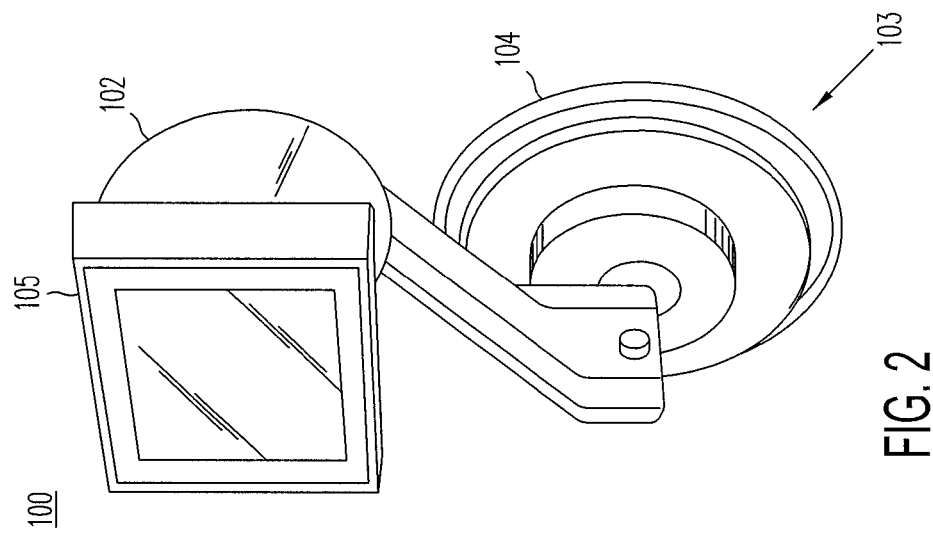
FIG. 2 shows small camera system 100 as seen from behind the window pane (i.e., on the indoor side), according to one embodiment of the invention.
Figure 3:
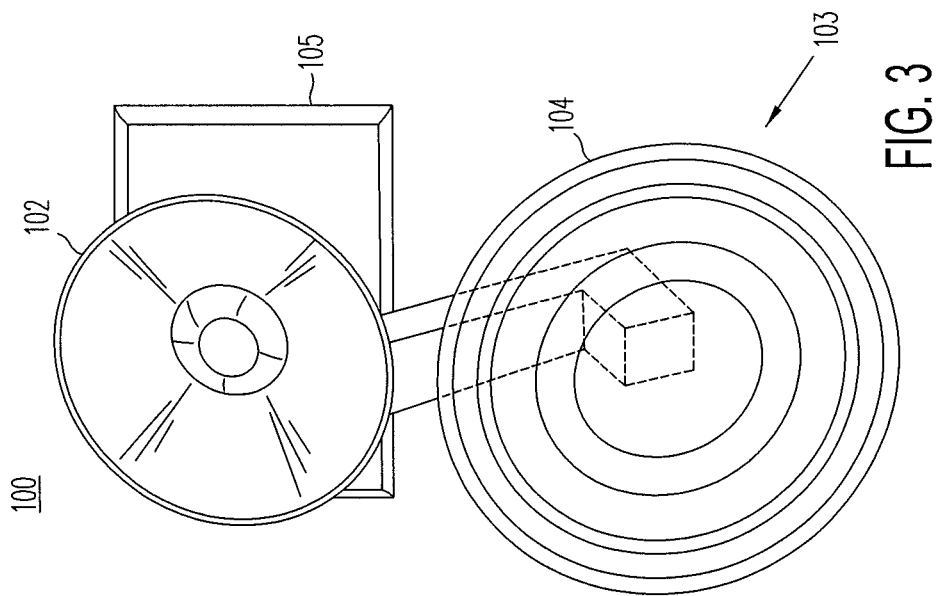
FIG. 3 shows small camera system 100 as seen from the other outdoor side of the window pane, according to one embodiment of the invention.
Figure 4:
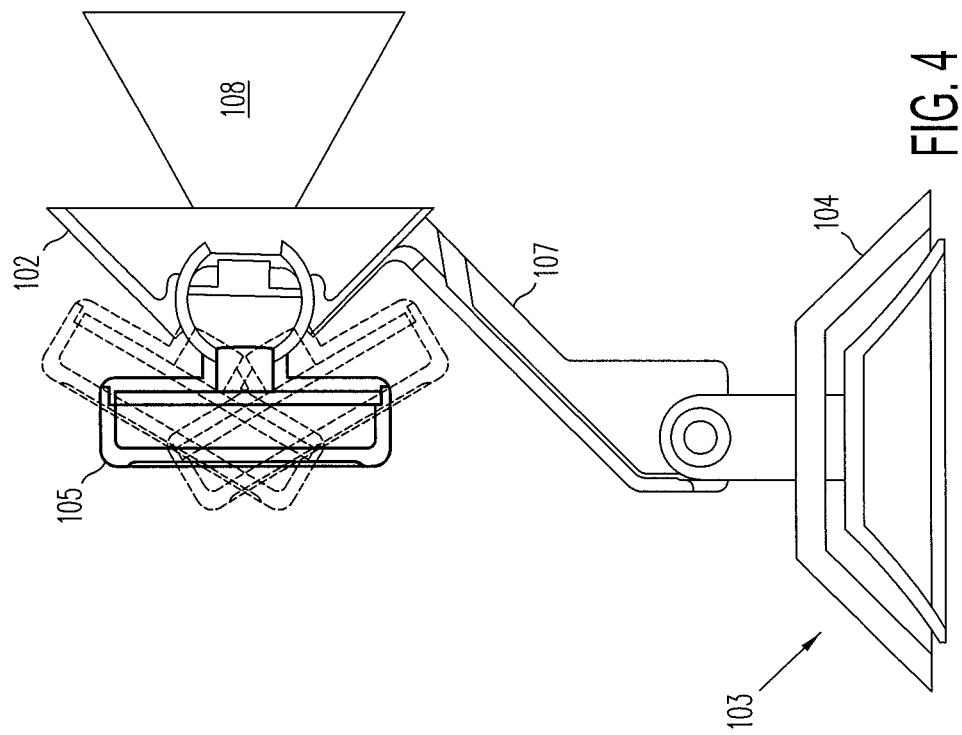
FIG. 4 shows small camera system 103 with suction cup 104 being attached onto a horizontal surface to function as a stable base, in accordance with one embodiment of the present invention.

FIG. 2 shows small camera system 100 as seen from behind the window pane (i.e., the indoor side), according to one embodiment of the invention. As shown in FIG. 2, camera body 105 may include a display panel that reproduces the image captured contemporaneously by the sensor of small camera system 100. Having such a display panel allows the user to point protruding lens 101 in the desired direction to capture the intended view. FIG. 3 shows small camera system 100 as seen from the other outdoor side of the window pane, according to one embodiment of the invention.

Additionally, suction cup 104 may be attached to any flat surface, FIG. 3 shows small camera system 103 with suction cup 104 being attached onto a horizontal surface (e.g., a desktop) to function as a stable base, in accordance with one embodiment of the present invention. In some embodiments, suction cup assembly 103 may include a relative heavy table structure for use as a stable base on a horizontal surface without using suction. FIG. 3 also shows various positions of camera body 105 and the resulting camera views (i.e., as defined by solid-angle view cone 108)

The detailed description above is provided to illustrate specific embodiments of the present invention and is not intended to be limiting. Numerous variations and modifications within the scope of the present invention are possible. The present invention is set forth in the following claims.

I claim:

1. A support assembly for a camera having lens protruding from the camera, comprising:

a hood having an opening to accommodate the protruding lens and a front end having a rim that lies on a single plane configured to rest snugly against a flat surface, the hood further includes a gimbaling collar around the opening to allow rotation of protruding lens around a symmetrical axis of the hood, so as to enable the camera to be positioned in any one of a number of positions that result in the protruding lens being pointed in one of a plurality of corresponding directions;

a base structure having a suction cup for attachment by suction on the flat surface; and a connecting arm connecting the base structure to the hood.

2. The support assembly of claim 1, wherein the connecting arm is connected by a hinge to the base structure, so as to allow movement of the connecting arm along a plane in order to urge the rim of the hood against the flat surface.

3. The support assembly of claim 1, wherein the corresponding directions lie on a circular locus.

4. The support assembly of claim 1, wherein the gimbaling collar is driven by a motor within the camera.

5. The support assembly of claim 4, wherein the camera includes a display that shows a contemporaneous image captured by the protruding lens.

6. The support assembly of claim 5, wherein the motor drives the camera to a desired position of the camera in response to commands provided to the camera through over wireless communication interface.

\* \* \* \* \*